(12) United States Patent
Liang

(10) Patent No.: US 11,109,573 B2
(45) Date of Patent: Sep. 7, 2021

(54) ROTARY BIRD FEEDER DEVICE

(71) Applicant: Hui Liang, Dongguan (CN)

(72) Inventor: Hui Liang, Dongguan (CN)

( * ) Notice: Subject to any disclaimer, the term of this patent is extended or adjusted under 35 U.S.C. 154(b) by 373 days.

(21) Appl. No.: 16/387,479

(22) Filed: Apr. 17, 2019

(65) Prior Publication Data

US 2020/0329678 A1    Oct. 22, 2020

(51) Int. Cl.
*A01K 39/01*    (2006.01)

(52) U.S. Cl.
CPC .................... *A01K 39/01* (2013.01)

(58) Field of Classification Search
CPC ........ A01K 31/14; A01K 39/00; A01K 39/01; A01K 39/0113; A01K 39/014
USPC ............ 119/57.8, 429, 52.2, 52.3, 57.9, 52.4
See application file for complete search history.

(56) References Cited

U.S. PATENT DOCUMENTS

| 6,401,658 B1* | 6/2002 | Teets ...................... A01K 39/00 119/52.2 |
| 7,516,657 B2* | 4/2009 | Fan ......................... G01P 13/02 73/170.01 |
| 2006/0065206 A1* | 3/2006 | Carter .................... A01K 31/14 119/429 |
| 2010/0175627 A1* | 7/2010 | Carpenter ............... A61L 2/238 119/174 |

* cited by examiner

*Primary Examiner* — Yvonne R Abbott-Lewis
(74) *Attorney, Agent, or Firm* — Leong C. Lei

(57) ABSTRACT

A rotary bird feeder device includes a direction indicator and a bird feeder. Through the combination of the direction indicator and the bird feeder, not only the direction indicator indicates the direction for others, but also birds feed on the bird feeder above the direction indicator, which has strong ornamental, smart and reasonable structure design, and strong practicality. The bird feeder has a rotating function to facilitate cleaning of the outside of the bird feeder. By providing a bird feeding space for storing birdseed in the direction indicator, the direction indicator has the function of a bird feeder, and the space design of the direction indicator is skillfully utilized.

11 Claims, 9 Drawing Sheets

ROTARY BIRD FEEDER DEVICE

BACKGROUND OF THE INVENTION

1. Field of the Invention

The present invention relates to a bird feeder device, and more particularly to a rotary bird feeder integrated with a direction indicator.

2. Description of the Prior Art

Conventional bird feeders are usually hung in branches, eaves or other higher positions where the bird feeders can be suspended. Some bird feeders are installed through a pole. In the prior art, some bird feeders have a simple structure, but their corresponding functions are few. Some bird feeders have more functions, but their structures are complicated so the cost for the structural design and installation is high.

Accordingly, the inventor of the present invention has devoted himself based on his many years of practical experiences to solve these problems.

SUMMARY OF THE INVENTION

In view of the drawbacks of the prior art, the primary object of the present invention is to provide a rotary bird feeder device. Through the combination of a direction indicator and a bird feeder, not only the direction indicator indicates the direction for others, but also birds feed on the bird feeder above the direction indicator, which has strong ornamental, smart and reasonable structure design, and strong practicality. The bird feeder has a rotating function to facilitate cleaning of the outside of the bird feeder. By providing a bird feeding space for storing birdseed in the direction indicator, the direction indicator has the function of a bird feeder, and the space design of the direction indicator is skillfully utilized.

In order to achieve the above object, the present invention adopts the following technical solutions.

A rotary bird feeder device comprises a pole body and a bird feeder disposed on a top of the pole body. The bird feeder is horizontally rotatable relative to the pole body. The pole body is provided with a direction indicator. The direction indicator has a bird feeding space therein for storing birdseed. The direction indicator further has a plurality of stations around the bird feeding space for birds to rest thereon.

The present invention has obvious advantages and beneficial effects compared with the prior art. Specifically, it can be known from the above technical solutions.

Through the combination of the direction indicator and the bird feeder, not only the direction indicator indicates the direction for others, but also birds feed on the bird feeder above the direction indicator, which has strong ornamental, smart and reasonable structure design, and strong practicality. The bird feeder has a rotating function to facilitate cleaning of the outside of the bird feeder. By providing the bird feeding space for storing birdseed in the direction indicator, the direction indicator has the function of a bird feeder, and the space design of the direction indicator is skillfully utilized.

DETAILED DESCRIPTION OF THE PREFERRED EMBODIMENTS

Figure 1:
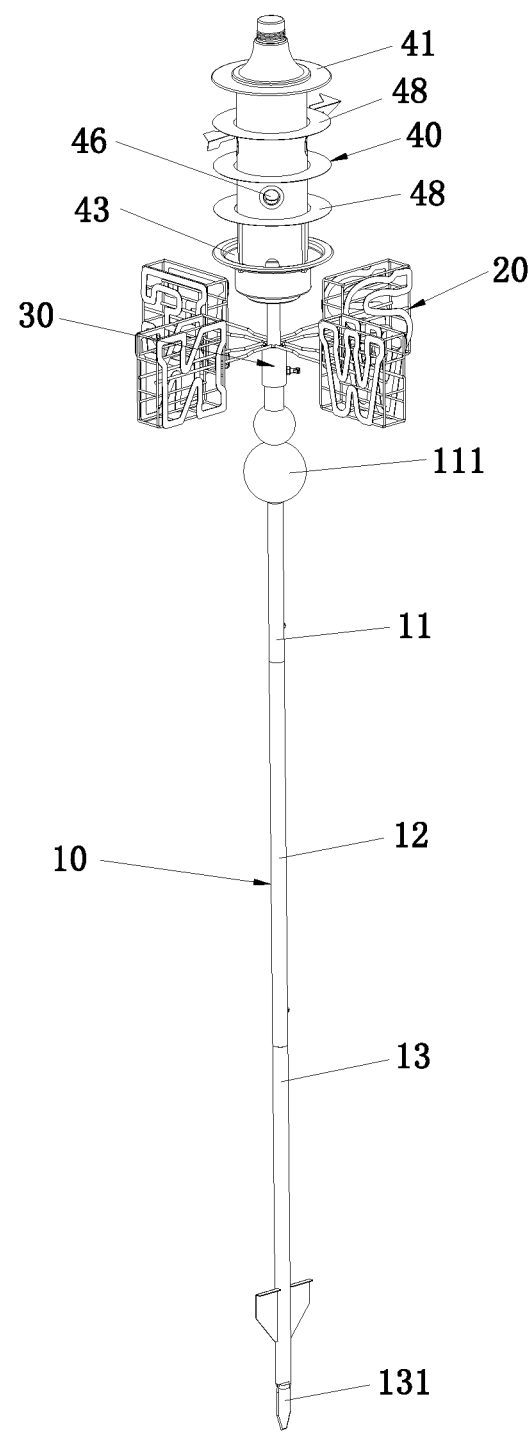
FIG. 1 is a perspective view according to a first embodiment of the present invention.

Embodiments of the present invention will now be described, by way of example only, with reference to the accompanying drawings.

Referring to FIG. 1 to FIG. 9, there are shown specific structures of two embodiments of the present invention.

A rotary bird feeder device comprises a pole body 10 and a bird feeder 40 disposed on the top of the pole body 10. The bird feeder 40 is horizontally rotatable relative to the pole body 10. The pole body 10 is provided with a direction indicator 20. The direction indicator 20 has a bird feeding space 222 therein for storing birdseed. The direction indicator 20 has a plurality of stations around the bird feeding space 222 for birds to rest thereon.

The top of the pole body 10 is provided with a connecting post 14 extending upwardly. The bottom of the bird feeder 40 is recessed to form a connecting groove 441. The connecting post 14 is fitted and positioned in the connecting groove 441 of the bird feeder 40. The bird feeder 40 is horizontally rotatable relative to the connection post 14. Preferably, the direction indicator 20 is located below the bird feeder 40. The bird feeding space 222 of the direction indicator 20 forms a surrounding arrangement relationship with the bird feeder 40. Through the combination of the direction indicator 20 and the bird feeder 40, not only the direction indicator 20 indicates the direction for others, but also birds feed on the bird feeder 40 above the direction indicator 20, which has strong ornamental, smart and reasonable structure design, and strong practicality. The bird feeder 40 has a rotating function to facilitate cleaning of the outside of the bird feeder 40. By providing the bird feeding space 222 for storing birdseed in the direction indicator 20, the direction indicator has the function of a bird feeder, and the space design of the direction indicator 20 is skillfully utilized.

Figure 2:
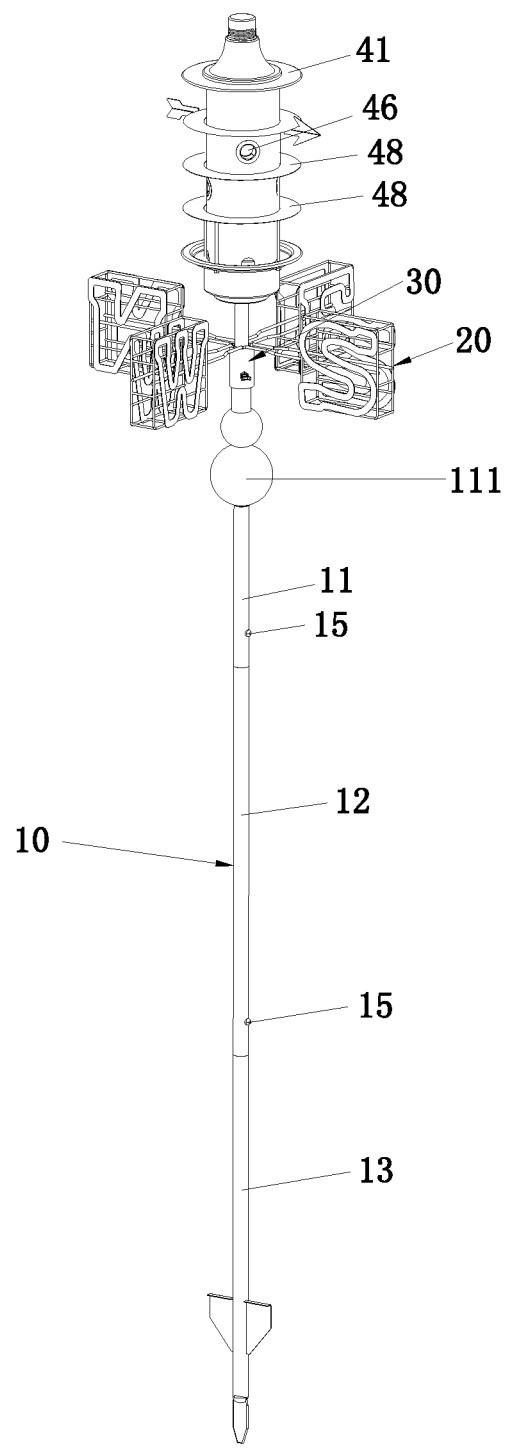
FIG. 2 is another perspective view according to the first embodiment of the present invention.
Figure 3:
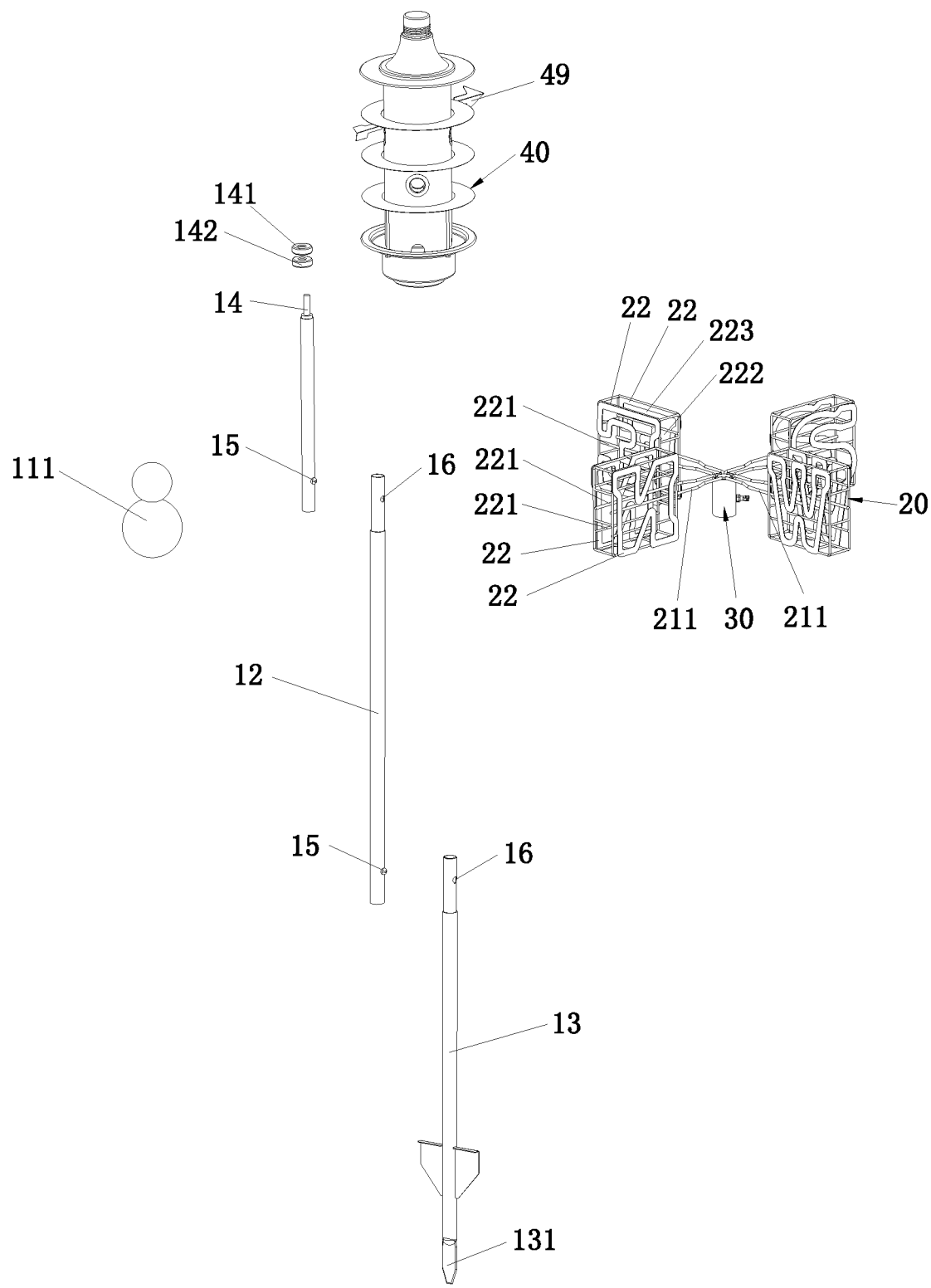
FIG. 3 is an exploded view according to the first embodiment of the present invention.

As shown in FIG. 1, FIG. 2 and FIG. 3, the connecting post 14 is provided with an upper gasket 141 and a lower gasket 142 for preventing the bird feeder 40 from rotating too fast and falling. The upper gasket 141 and the lower gasket 142 are disposed on the upper and lower ends of the connecting post 14, respectively. The inner circumferential surfaces of the upper gasket 141 and the lower gasket 142 are in contact with the outer circumferential surface of the connecting post 14. The outer circumferential surfaces of the upper gasket 141 and the lower gasket 142 are in contact with the inner circumferential surface of the connecting groove 441. In this way, the design of the gaskets increases the friction when the bird feeder rotates, which can prevent the bird feeder from rotating too fast and falling and has better assembly stability and practicability.

Figure 5:
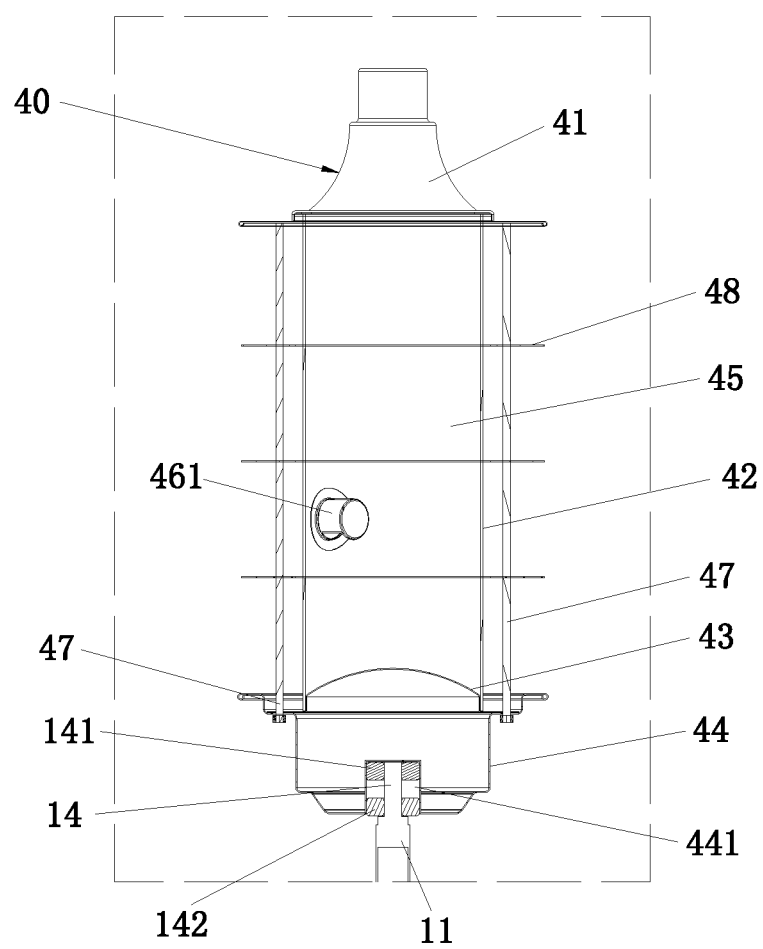
FIG. 5 is a first cross-sectional view according to the first embodiment of the present invention.
Figure 6:
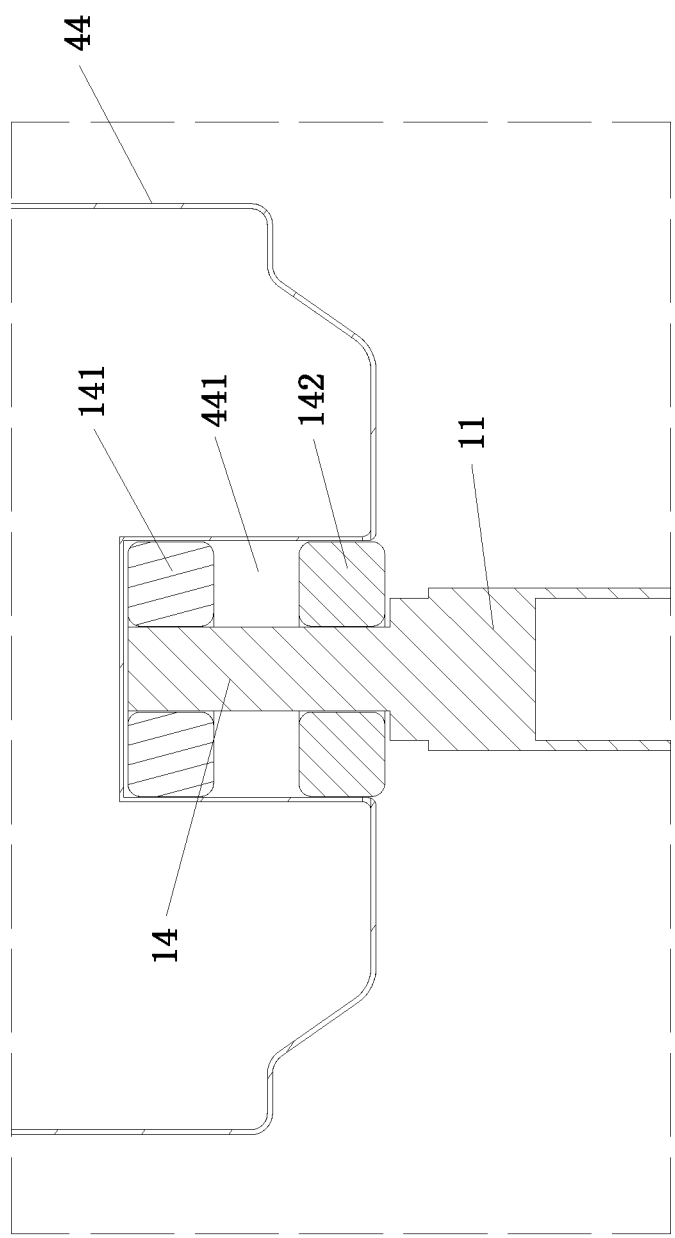
FIG. 6 is a second cross-sectional view according to the first embodiment of the present invention.

As shown in FIG. 5 and FIG. 6, the bird feeder 40 includes a top plate 41, a casing 42 and a bottom plate 43. The top plate 41, the casing 42 and the bottom plate 43 collectively form an accommodating chamber 45 for storing birdseed. The casing 42 is provided with an opening 46 for feeding the bird. The opening 46 communicates with the accommodating chamber 45. The casing 42 is provided with a plurality of pedal plates 48 for bird to stand thereon. The pedal plates 48 divide the casing 42 into multiple feeding areas. Each feeding area is provided with the opening. Preferably, the inner side of the opening 46 is provided with a baffle 461. The baffle 461 extends inwardly corresponding to the inner side of the opening 46. The baffle 461 is connected to the upper section of the opening 46.

The lower end of the bottom plate 43 is provided with a base 44. The connecting groove 441 is formed at the underside of the base 44. The base 44 has a hollow interior. The base 44, the bottom plate 43 and the pedal plates 48 are provided with positioning holes, respectively. A connecting member 47 is inserted in a bottom-up direction to pass through the positioning holes of the base 44, the bottom plate 43 and the pedal plates 48 in sequence for fixing and connecting the base 44, the bottom plate 43 and the pedal plates 48. The top end of the connecting member 47 is in contact with the underside of the top plate 41. Preferably, the outside of the bird feeder is provided with an arrow 49.

Figure 7:
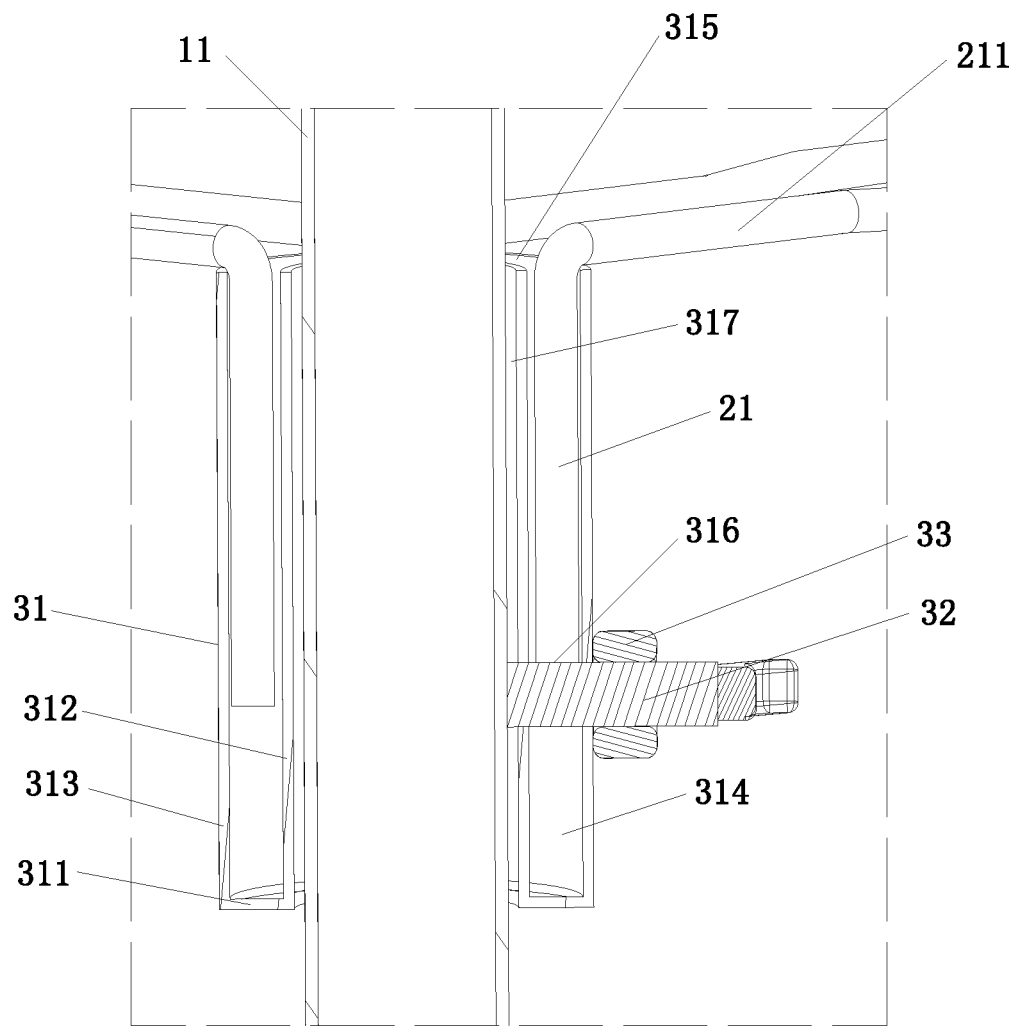
FIG. 7 is a third cross-sectional view according to the first embodiment of the present invention.

As shown in FIG. 3 and FIG. 7, the present invention further comprises an adjusting and positioning assembly 30 for detachably mounting and positioning the direction indicator 20 to the pole body 10. The adjusting and positioning assembly 30 includes a sleeve 31 and an adjusting screw 32. The sleeve 31 has a bottom wall 311, an inner annular wall 312, and an outer annular wall 313. The inner annular wall 312 and the outer annular wall 313 are connected to the bottom wall 311. The outer annular wall 313 surrounds the inner annular wall 312 to form a positioning groove 314 between the inner annular wall 312 and the outer annular wall 313. The positioning groove 314 has an upper opening 315. The inner annular wall 312 and/or the outer annular wall 313 are provided with threaded holes 316 extending horizontally. The bottom wall 311 is provided with a hole 317 extending vertically. The inner annular wall 312 surrounds the hole 317.

The direction indicator 20 is connected with a positioning portion 21 extending vertically.

The pole body 10 passes through the hole 317 of the bottom wall 311 of the sleeve 31. The adjusting screw 32 passes through the threaded holes 316 of the outer annular wall 313 and the inner annular wall 312 in sequence. The inner end of the adjusting screw 32 abuts against the pole body 10. A nut 33 is fitted on the adjusting screw 32, and the nut 32 is pressed against the outside of the outer annular wall 313. The positioning portion 21 is inserted from the upper opening 315 into the positioning groove 314. Through the structural design of the direction indicator 20 and the adjusting and positioning assembly 30, the direction indicator 20 is detachably mounted to the pole body 10. In particular, the positioning groove 314 enables the positioning portion 21 of the direction indicator 20 to adjust the inserted orientation freely. The operation is simpler and more convenient. Of course, the detachable assembly of the direction indicator 20 facilitates the management and storage of parts and reduces transportation costs.

The direction indicator 20 includes four direction indicators defined as east, south, west, and north direction indicators 20, respectively. The English words of the east, south, west, and north direction indicators 20 are abbreviated as E, S, W, and N. The direction indicator 20 has two identification plates 22 disposed oppositely. A plurality of connecting strips 221 are connected between the two identification plates 22 to form the bird feeding space 222. The bird feeding space 222 has an upper end opening 223.

The upper end of the positioning portion 21 extends outwardly and horizontally to form a horizontal extension portion 211. The outer end of the horizontal extension portion 211 is connected between the two identification plates 22. Preferably, the direction indicator 20 is provided with two positioning portions 21, and the two positioning portions 21 are spaced apart from each other. The upper ends of the two positioning portions 21 extend outwardly and horizontally to form horizontal extension portions 211, respectively. Each of the identification plates 22 is connected with the horizontal extension portion 211.

The pole body 10 includes an upper pole 11, a middle pole 12 and a lower pole 13 that are detachably assembled in sequence. The direction indicator 20 is disposed on the upper pole 11. The lower end of the lower pole 13 is provided with a peg 131. The connecting post 14 is disposed on the top of the upper pole 11 to extend upwardly. Through the multi-pole design of the pole body 10, the pole body 10 can be disassembled to be transported conveniently, thereby occupying less space. In particular, the disassembly and assembly is easy, the strength is high, the cost is low, and the fixing property is good during use.

Figure 4:
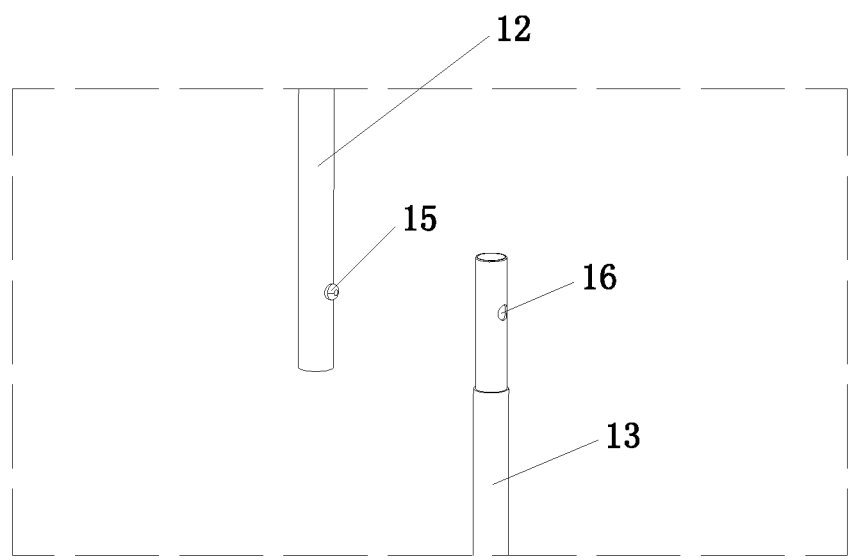
FIG. 4 is a partial enlarged view according to the first embodiment of the present invention.

As shown in FIG. 3 and FIG. 4, in the first embodiment, the middle pole 12, the upper pole 11 and the lower pole 13 are detachably connected to each other through buckle holes 16 and buckle members 15. The middle pole 12 is provided with buckle members 15. The upper pole 11 and the lower pole 13 are provided with buckle holes 16. The buckle members 15 of the middle pole 12 are engaged in the buckle holes 16 of the upper pole 11 and the lower pole 13, so that the upper pole 11 and the lower pole 13 are connected to the middle pole 12.

Preferably, the upper end of the middle pole 12 is provided with a buckle hole 16, and the lower end of the middle pole 12 is provided with a buckle member 15. The upper pole 11 is provided with a buckle member 15. The lower pole 13 is provided with a buckle hole 16. The buckle hole 16 and the buckle member 15 of the middle pole 12 are engaged with the buckle member 15 of the upper pole 11 and the buckle hole 16 of the lower pole 13 respectively to form a detachable connection of the upper pole 11, the middle pole 12 and the lower pole 13.

Figure 8:
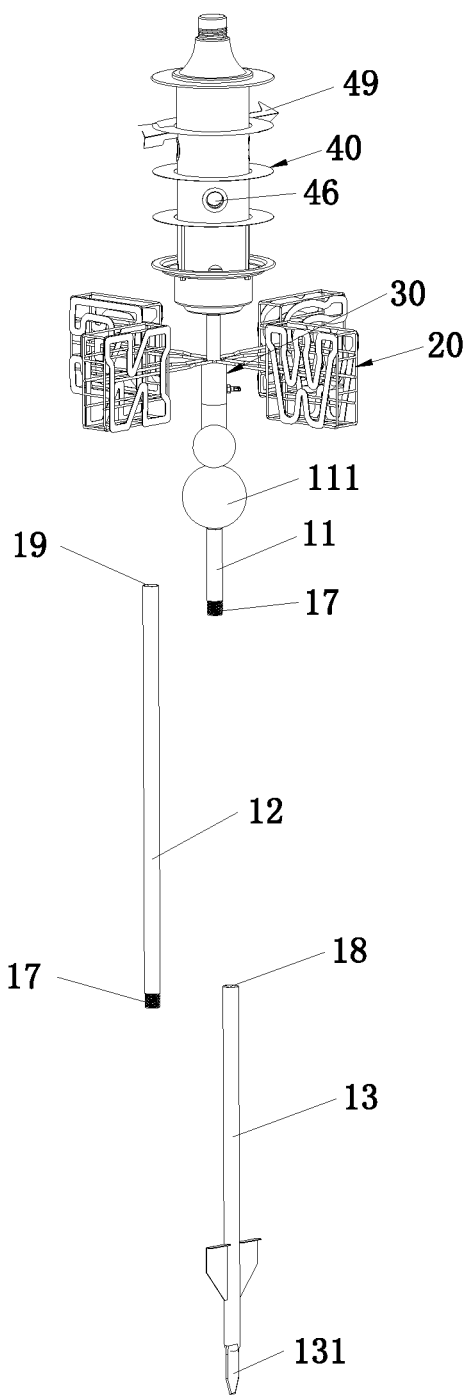
FIG. 8 is an exploded view according to a second embodiment of the present invention.
Figure 9:
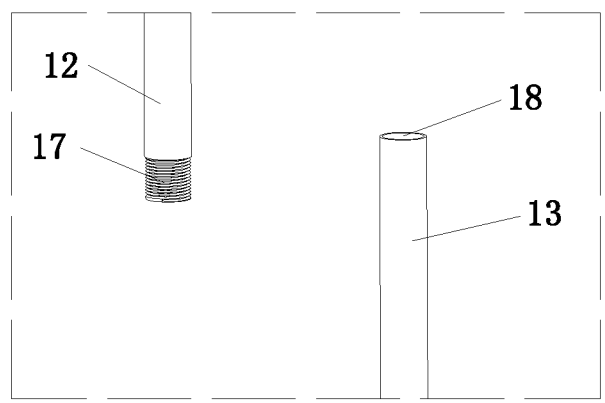
FIG. 9 is a partial enlarged view according to the second embodiment of the present invention.

As shown in FIG. 8 and FIG. 9, in the second embodiment, the middle pole 12, the upper pole 11 and the lower pole 13 are detachably connected to each other through internal threads and external threads. Preferably, the upper end of the middle pole 12 is provided with a first mounting hole 19, and the lower end of the middle pole 12 is provided with external threads 17. The upper pole 11 is provided with external threads 17. The lower pole 13 is provided with a second mounting hole 18. Internal threads are provided in the first mounting hole 19 and the second mounting hole 18. The first mounting hole 19 of the middle pole 12 is mated with the external threads 17 of the upper pole 11, and the external threads 17 of the middle pole 12 is mated with the second mounting hole 18 of the lower pole 13 to form an assembled connection of the middle pole 12, the upper pole 11 and the lower pole 13.

Of course, the connection of the upper pole 11, the middle pole 12 and the lower pole 13 of the pole body 10 is limited to the above, and it can be achieved by other means.

Preferably, the pole body 10 is provided with a decorative member 111. The decorative member 111 is located below the direction indicator 20.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A rotary bird feeder device, comprising a pole body and a bird feeder disposed on a top of the pole body, the bird feeder being horizontally rotatable relative to the pole body; the pole body being provided with a direction indicator, the direction indicator having a bird feeding space therein for storing birdseed, the direction indicator further having a plurality of stations around the bird feeding space for birds to rest thereon.

2. The rotary bird feeder device as claimed in claim 1, wherein the top of the pole body is provided with a connecting post extending upwardly, a bottom of the bird feeder is recessed to form a connecting groove, the connecting post is fitted and positioned in the connecting groove of the bird feeder, and the bird feeder is horizontally rotatable relative to the connection post.

3. The rotary bird feeder device as claimed in claim 2, wherein the connecting post is provided with an upper gasket and a lower gasket for preventing the bird feeder from rotating too fast and falling, the upper gasket and the lower gasket are disposed on upper and lower ends of the connecting post respectively, inner circumferential surfaces of the upper gasket and the lower gasket are in contact with an outer circumferential surface of the connecting post, and outer circumferential surfaces of the upper gasket and the lower gasket are in contact with an inner circumferential surface of the connecting groove.

4. The rotary bird feeder device as claimed in claim 1, further comprising an adjusting and positioning assembly for detachably mounting and positioning the direction indicator to the pole body;

the adjusting and positioning assembly including a sleeve and an adjusting screw; the sleeve having a bottom wall, an inner annular wall and an outer annular wall, the inner annular wall and the outer annular wall being connected to the bottom wall, the outer annular wall surrounding the inner annular wall to form a positioning groove between the inner annular wall and the outer annular wall, the positioning groove having an upper opening; the inner annular wall and the outer annular wall being provided with threaded holes extending horizontally; the bottom wall being provided with a hole extending vertically, the inner annular wall surrounding the hole;

the direction indicator being connected with a positioning portion extending vertically;

the pole body passing through the hole of the bottom wall of the sleeve, the adjusting screw passing through the threaded holes of the outer annular wall and the inner annular wall in sequence, an inner end of the adjusting screw abutting against the pole body, a nut being fitted on the adjusting screw, the nut being pressed against an outside of the outer annular wall, the positioning portion being inserted from the upper opening into the positioning groove.

5. The rotary bird feeder device as claimed in claim 1, wherein the direction indicator includes four direction indicators defined as east, south, west, and north direction indicators respectively, English words of the east, south, west, and north direction indicators are abbreviated as E, S, W, and N; each of the direction indicators has two identification plates disposed oppositely, a plurality of connecting strips are connected between the two identification plates to form the bird feeding space, and the bird feeding space has an upper end opening.

6. The rotary bird feeder device as claimed in claim 5, wherein the direction indicator is located below the bird feeder, and the bird feeding spaces of the four direction indicators form a surrounding arrangement relationship with the bird feeder.

7. The rotary bird feeder device as claimed in claim 1, wherein an outside of the bird feeder is provided with an arrow.

8. The rotary bird feeder device as claimed in claim 1, wherein the pole body includes an upper pole, a middle pole and a lower pole that are detachably assembled in sequence; the direction indicator is disposed on the upper pole, and a lower end of the lower pole is provided with a peg.

9. The rotary bird feeder device as claimed in claim 8, wherein the middle pole, the upper pole and the lower pole are detachably connected to each other through internal threads and external threads.

10. The rotary bird feeder device as claimed in claim 8, wherein the middle pole, the upper pole and the lower pole are detachably connected to each other through buckle holes and buckle members.

11. The rotary bird feeder device as claimed in claim 1, wherein the pole body is provided with a decorative member, and the decorative member is located below the direction indicator.

* * * * *